(No Model.)
E. FISHER.
SLED BRAKE.
No. 280,165. Patented June 26, 1883.
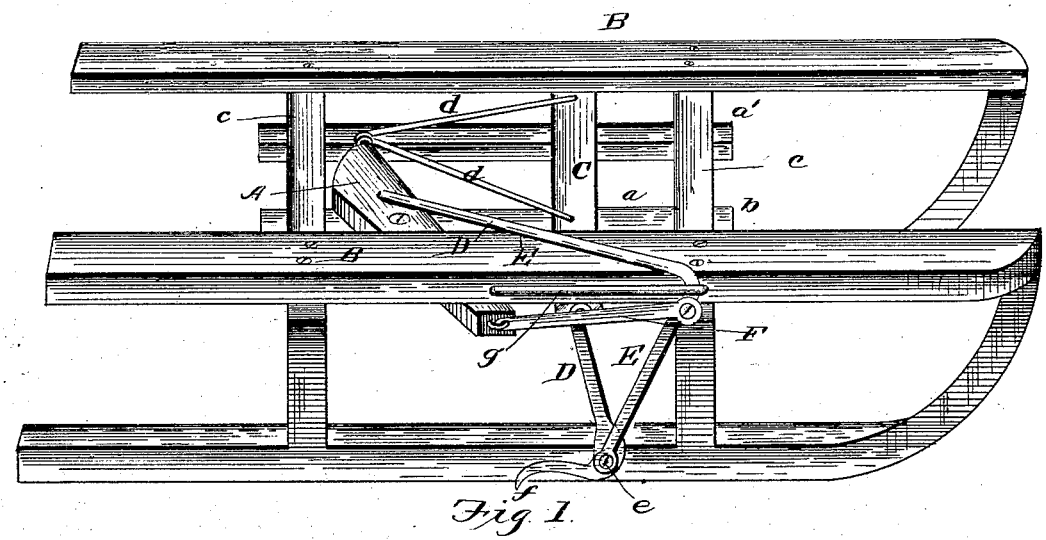
Fig. 1.
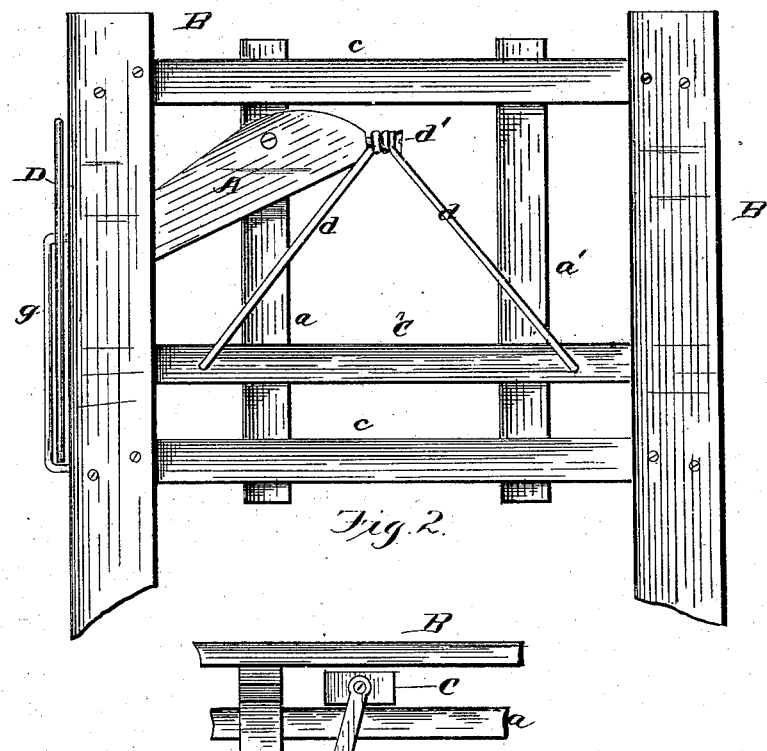
Fig. 2.
Fig. 3.
Witnesses:
Wm. S. Duvall
D. Bernhard
Inventor:
Enos Fisher
Per McGrew & Small
Atty's

UNITED STATES PATENT OFFICE.

ENOS FISHER, OF ADAMSBOROUGH, INDIANA.

SLED-BRAKE.

SPECIFICATION forming part of Letters Patent No. 280,165, dated June 26, 1883.

Application filed April 4, 1883. (No model.)

*To all whom it may concern:*

Be it known that I, ENOS FISHER, a citizen of the United States, residing at Adamsborough, in the county of Cass and State of Indiana, have invented certain new and useful Improvements in Sled-Brakes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention pertains to improvements in brakes for sleds or sleighs, having for its object facility and convenience of operation in retarding the movement of the sled or sleigh, or enabling the descent of declivities with perfect safety and at the usual rate of travel; and it consists in the combination and arrangement of parts, substantially as hereinafter fully set forth and claimed.

In the accompanying drawings, Figure 1 is a perspective view of my improved brake applied to a sled or sleigh. Fig. 2 is an enlarged plan view with parts broken away, and Fig. 3 is a side view of my brake with the parts reduced and broken away.

In carrying out my invention I employ a horizontal lever, A, fulcrumed near one end to a cross-piece, $a$, of the sled or sleigh B. One end of this lever is connected to a sliding bar, C, adapted to move on the piece $a$, and a parallel piece $a'$, said pieces $a$ $a'$ being secured to the under side of cross-pieces $c$ $c$ of the sled or sleigh, the means of connection between said lever and sliding bar consisting of rods $d\, d$, with their convergent ends secured to said end of lever preferably by coiling or twisting them around a headed projection or stud, $d'$, thereon, and with divergent ends secured to the slide near its ends, whereby the sled is enabled to have movement in a plane almost perfectly at right angles with the length of the sled or sleigh, to permit the simultaneous operation of the brakes.

D D are the brake-levers, with the upper ends of their vertical arms connected to the ends of the sliding bar C, and the lower ends of said arms fulcrumed upon pivots $e$, secured to the outer sides of the runners, while their horizontal arms are provided with angular pointed ends $f$ at their outer extremities, to cause them to penetrate the ground.

E is a right-angled hand-lever, with its approximately horizontal arm arranged within convenient reach of the driver or operator, and its nearly vertical arm fulcrumed upon the pivot $e$ of one brake-lever D, and limited in its movement by the guide or keeper $g$, through which it passes. The lever E is connected by a link or rod to the lever A.

It will be noticed that upon depressing the hand-lever E the links F will draw that end of the lever A forward, which will cause the short arm of the later lever to draw, by means of the rods $d$, upon and move the slide C rearward, which will similarly affect upper arms of the brake-levers and cause their points to penetrate the earth. This action of the parts or brakes, it is obvious, will arrest the tendency of the sled or sleigh to move too rapidly in passing down declivities or hills, and enable the holding the sled or sleigh off the horse, while by a reverse movement of the hand-lever the brakes may be released when a level has been reached.

I claim and desire to secure by Letters Patent—

In a sled or sleigh brake, the combination, with the slide carrying the brake-levers adapted to enter the ground, of the lever with one end connected by the convergent and divergent ended rods to the said slide, and the approximately right-angled hand-lever linked to the long arm of the former lever, substantially as and for the purpose set forth.

In testimony whereof I affix my signature in presence of two witnesses.

ENOS FISHER.

Witnesses:
SAMUEL S. DILLMON,
MORGAN J. MORGAN.